Feb. 26, 1952 W. A. MacARTHUR 2,587,054
POWER-DRIVEN TAPER CUTTING SAW
Filed July 26, 1948 4 Sheets-Sheet 3
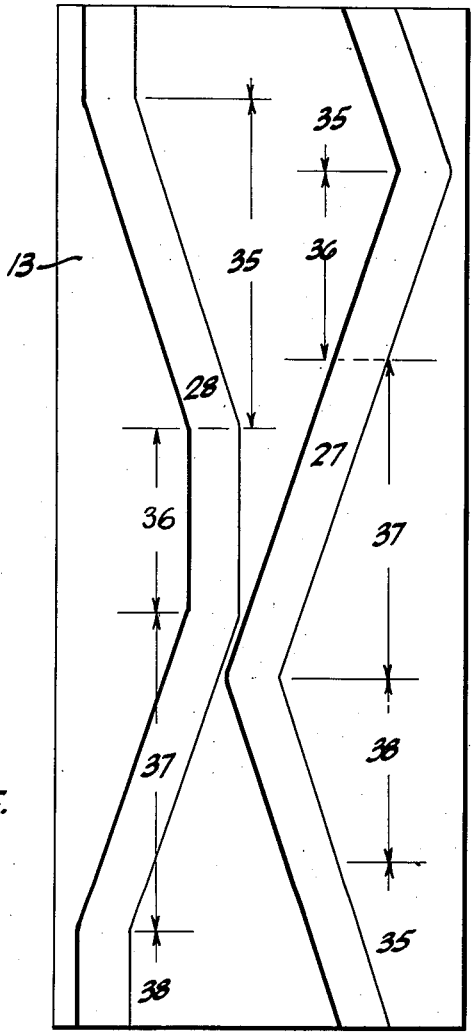
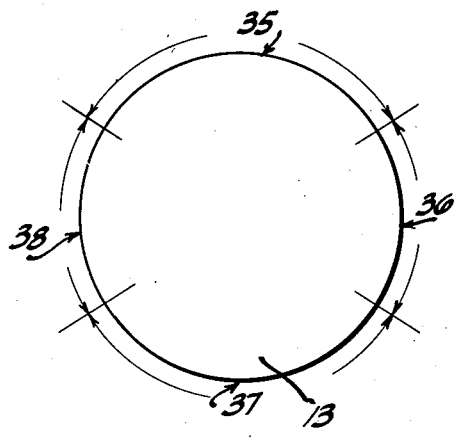
FIG. 4.
FIG. 5.
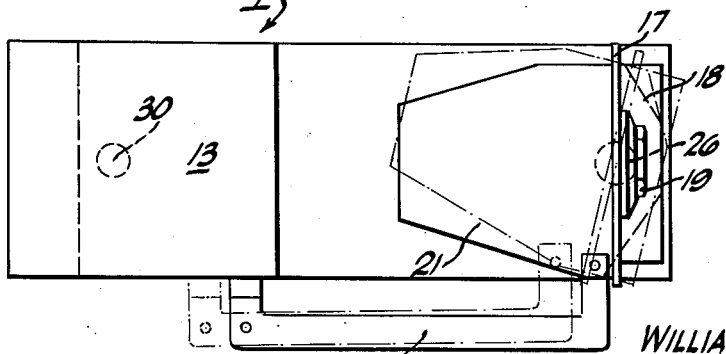
FIG. 6.
INVENTOR.
WILLIAM A. MACARTHUR
BY
ATTORNEY.

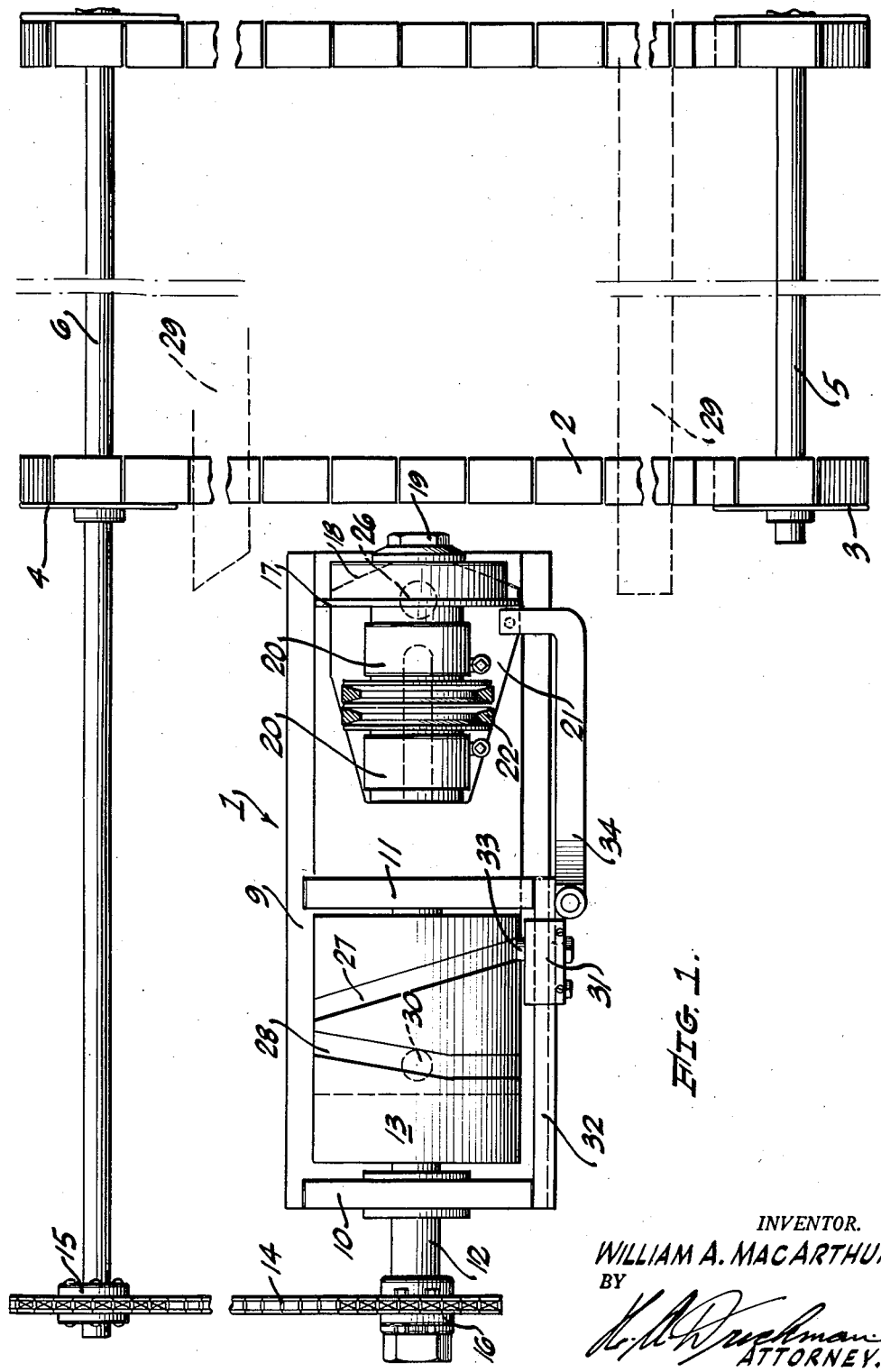

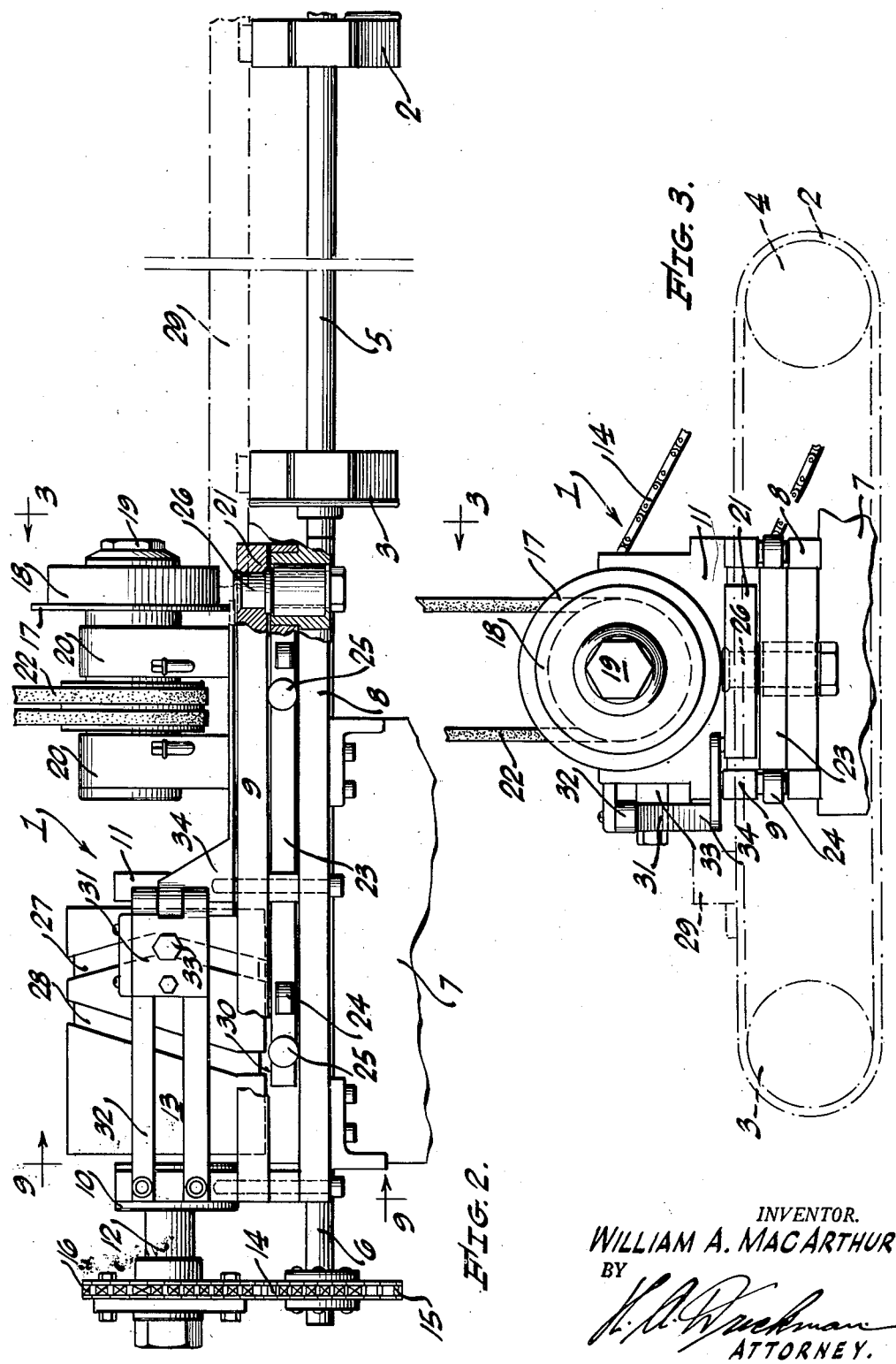

Feb. 26, 1952 W. A. MacARTHUR 2,587,054
POWER-DRIVEN TAPER CUTTING SAW
Filed July 26, 1948 4 Sheets-Sheet 4

INVENTOR.
WILLIAM A. MacARTHUR.
BY
ATTORNEY.

Patented Feb. 26, 1952

2,587,054

UNITED STATES PATENT OFFICE 2,587,054

POWER-DRIVEN TAPER CUTTING SAW

William A. MacArthur, Long Beach, Calif.

Application July 26, 1948, Serial No. 40,773

6 Claims. (Cl. 143—36)

This invention relates to a power driven taper cutting saw which may be used in the manufacture of window sashes, door frames, and the like, and in which the wooden parts of the sash, frame, or the like, are tapered or mitered so that they will fit together to form a rectangular sash, frame, or the like.

An object of my invention is to provide a novel power driven taper cutting saw which may be used in connection with a cross-cut saw, this cross-cut saw including a continuously rotating belt or drive chain on which the wood pieces are placed, and where said wood pieces are cut.

Another object of my invention is to provide a novel power driven taper cutting saw in which the saw is partially rotated on its mount to cut opposite tapers on successive pieces of wood, which are fed on the chain or conveyor, said partial rotation of the saw being accomplished automatically as successive pieces of wood are cut.

Still another object of my invention is to provide a novel power driven taper cutting saw in which the saw is automatically moved in a plane lateral to the movement of the piece of wood being cut, whereby the wood piece being cut can move continuously on its chain or conveyor while a taper is being cut on the end of the wood piece.

A feature of my invention is to provide a novel power driven taper cutting saw in which the rotation of the saw and the lateral movement thereof is accomplished by two cam tracks or grooves, the cam being rotated in timed relation to the movement of the wood pieces on their conveyor or chains.

Other objects, advantages and features of invention may appear from the accompanying drawing, the subjoined detailed description and the appended claims.

In the drawing:

Figure 1 is a top plan view of my power driven taper cutting saw.

Figure 2 is a side view of the same with parts broken away to show interior construction.

Figure 3 is a transverse sectional view taken on line 3—3 of Figure 2.

Figure 4 is a diagrammatic end view of the cam showing the various positions of movement of the saw.

Figure 5 is a flat development of the cam drum.

Figure 6 is a top plan view of the saw in one cutting position.

Figure 7:
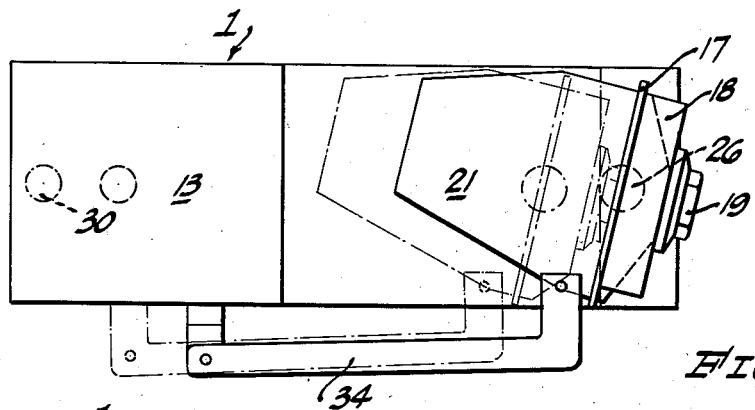
Figure 7 is a plan view of my saw with the saw shifted laterally.

Referring more particularly to the drawing, my power driven taper cutting saw 1 is mounted adjacent to, and is driven in a timed relation with the belt, chain or conveyor 2. This belt, chain or conveyor is usual in a planing mill, and the belt or chains travel over pulleys 3, 4. These pulleys are mounted on shafts 5, 6, respectively, and the shaft 6 is driven by a suitable prime mover (not shown). However, this shaft is rotated continuously.

My taper cutting saw consists of a support 7, which carries the saw, and holds it in proper relation to the conveyor 2. A table 8 is provided on top of the support 7, and this table is stationary. Above the table and slightly spaced therefrom, are guide rails 9—9, one on each side of the table, and extending lengthwise thereof. The guide rails 9—9, in their spaced relation to the table 8, provide a guideway, the purpose of which will be further described.

A pair of bearing blocks 10, 11 are fixedly mounted on the support 7, and these bearing blocks carry the shaft 12, on which the cam drum 13 is fixedly mounted. The shaft 12 is driven in timed relation with the power shaft 6, by means of a chain 14 (or other drive means) which encircles the sprockets 15, 16, on the shafts 6 and 12, respectively, thus continuously rotating the cam drum 13, in timed relation with the shaft 6, and consequently with the movement of the conveyor 2. The taper cutting saw 17 and the dado 18 are mounted on the arbor 19. This arbor is journaled in blocks 20, 20, which rise from a carriage 21. This carriage is partially rotatable on a pivot, which will be further described.

The arbor 19 is continuously rotated by suitable drive belts 22, which extend to a power source not shown. The saw 17 is thus continuously rotated without regard to any particular timing arrangement. The carriage 21 is pivotly mounted on a platform 23, which platform can slide laterally of the conveyor 2, this platform being held in its proper aligned position by a plurality of rollers 24, which are journaled between the rails 8 and 9. The platform 23 also operates on rollers 25, journaled thereon. A pivot pin 26 rises from the platform 23, and extends through the carriage 21, thus permitting this carriage to be partially rotated in a horizontal plane, as will be further described.

The cam drum 13 is formed with two cam grooves 27 and 28, the groove 27 acting to control the partial rotation of the saw 17 on its pivot 26, and the groove 28 serves to oscillate or move the platform 23 back and forth horizontally as the saw 17 is making its cut. As shown particularly in Figure 1, the wooden members 29, which are spaced on the conveyor 2, are each cut on a taper by the saw 17. The successive wooden members are cut oppositely, that is, one cut is made from left to right and the next one is made from right to left. This is the reason why the saw 17 must be rotated about the pin 26. The taper cuts on the end of the wooden members 29 form a miter joint of the type which are usual and well known in window sashes, frames, etc. These taper cuts are made on the wooden member 29, while that member is being continuously moved on the conveyor 2. To compensate for this conveyor movement, and to prevent the saw from being broken or jammed, it is necessary to move the entire saw assembly horizontally, and this is done by the cam groove 28. The platform 23 is guided for horizontal movement on the rollers 24 and 25, as previously described, and this platform is provided with a pin 30, which projects upwardly into the cam groove 28. Obviously, as the drum 13 is rotated, in timed relation to the movement of the conveyor 2, the pin 30 will follow this cam groove and will oscillate the platform 23, as will be evident. A rider 31 is slidably mounted on the rails 32, to which rails are attached blocks 10, 11. A pin 33 projects inwardly from the rider 31, and enters the cam groove 27. Rotation of the drum 13 will thus cause the rider 31 to oscillate and a link 34, secured to the rider at one end, and to the carriage 21 at the other, will cause the carriage to be partially rotated around the pivot pin 26, thus tilting the saw 17, and forming a tapered cut on the end of the wooden member 29. The link 34 is pivotally attached at both ends since there is a slight tilt of this member as the carriage 21 rotates.

The proper timing of the rotation of the saw 17, as well as the horizontal movement of the platform 23, is accomplished in the cam drum 13 and the grooves 27, 28. Considering Figures 4 and 5, Figure 4 shows the angle of rotation of the drum 13, while the saw is making the cut from left to right. This is indicated at 35. Next in right hand rotation, there is shown the angle of the first shift shown at 36. Third, the cut of the saw from right to left, indicated at 37, and finally the shift of the platform shown at 38. The two cut operations 35 and 37 are shown in Figure 5, and it is to be noted that while the cut is occurring the cam 28 is also moving the platform 23 horizontally and is moving it either left to right, or right to left. When the cut on the wooden member 29, has been completed, the saw 17 is shifted and while this shifting of the saw occurs, the platform 23 is stationary. The platform 23 can be held stationary by merely cutting the cam 28 so that the groove is parallel to the direction of rotation of the drum 13. This will be evident from Figure 5.

Figure 8:
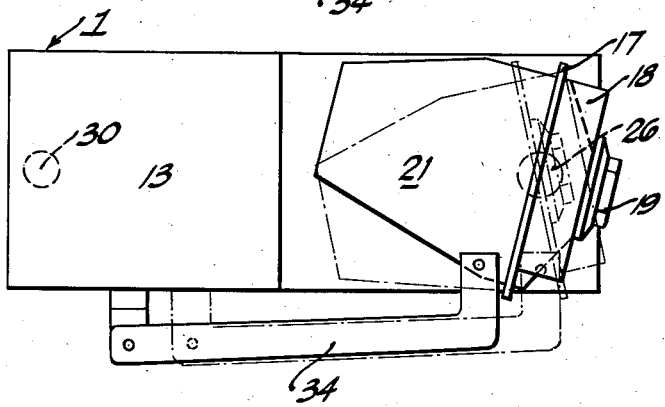
Figure 8 is a top plan view of my saw in another rotated position.
Figure 9:
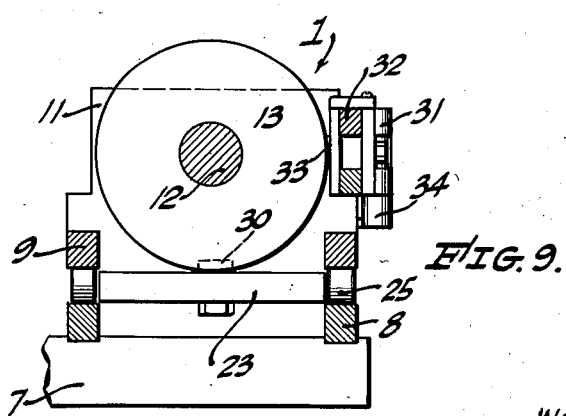
Figure 9 is a transverse sectional view taken on line 9—9 of Figure 2.

Figures 6, 7, and 8, illustrate the positions of the saw 17, when cutting the opposite angles on the wooden members 29, and also show the positions of the link 34 to accomplish this partial rotation of the carriage 21, and these views also show the horizontal movement of this carriage and the platform 23, as urged by the cam groove 28. Due to the twisting of the drive belts 22, it is preferable that these belts be flexible. Since the drum 13 rotates in constant timed relation to the drive of the conveyor 2, it will be evident that the saw 17 will be rotated to the proper cutting angle, and will also be moved horizontally at the correct speed so that a taper cut is formed on the end of the wooden members.

In operation, assuming that the first cut is to be made from left to right on the wooden member, the saw is then tilted as shown in dotted lines in Figure 8, and at the same time the saw, that is, the carriage 21 and the platform 23, must be moved in the same direction from left to right. The cams 27 and 28 are so cut that this action will occur and the saw 17 will remain at the angle shown in dotted lines in Figure 8 until the cut is completed. When the cut is completed the saw then immediately swings to the angular position shown in solid lines in Figure 7. The cut is now accomplished from right to left, and the amount of this right to left movement is shown from the solid to the dotted lines in Figure 7. This completes the cycle, and the saw is again moved to the dotted position shown in Figure 8, and the cycle is repeated.

Having described my invention, I claim:

1. In combination with a conveyor and a drive means for said conveyor of a power driven taper cutting saw comprising a base, means mounting the saw on said base for partial rotation thereon, a cam drum, said cam drum having cam grooves therein, a drive extending from said conveyor drive means, to said drum, a follower fitted in a cam groove and connected to the mounting means whereby said means is partially rotated, means slidably mounting the saw on the base, and a second cam follower extending into a cam groove and connected to the slidable mounting means whereby said saw is reciprocated.

2. In combination with a conveyor and a drive means for said conveyor, a power driven taper cutting saw, the work engaged by the saw being moved on the conveyor, said saw comprising a base, a platform reciprocally mounted on the base, a carriage pivotally mounted on said platform, said saw being mounted on the carriage, a cam drum, drive means extending from the cam drum to the conveyor drive, and link means connecting said drum and said platform, and a second link means connecting said drum and the carriage whereby said carriage is partially rotated and reciprocated.

3. In combination with a conveyor and a drive means for said conveyor, a power driven taper cutting saw, the work engaged by the saw being moved on the conveyor, said saw comprising a base, a platform reciprocally mounted on the base, a carriage pivotally mounted on said platform, said saw being mounted on the carriage, a cam drum, drive means extending from the cam drum to the conveyor drive, said drum having cam grooves therein, a follower fitted in a cam groove, a link connecting said follower and said platform, whereby the platform is reciprocated, a second follower fitted into a cam groove, and a second link connecting the second follower, and said carriage whereby the carriage is partially rotated.

4. In combination with a conveyor and a drive means for said conveyor, a power driven taper cutting saw, said conveyor moving the work into the saw, said saw comprising a base, a table on the base, a platform reciprocally mounted on the table, a carriage pivotally mounted on the platform for swinging movement thereon, said saw being mounted on the carriage, a cam drum journaled on the table, drive means extending from the cam drum to the conveyor drive, means connecting the cam drum and the platform, a second means connecting the cam drum and the carriage, said first means reciprocating the platform and the second means partially rotating the carriage.

5. In combination with a conveyor and a drive means for said conveyor, a power driven taper cutting saw, said conveyor moving the work into the saw, said saw comprising a base, a table on the base, a platform reciprocally mounted on the table, a carriage pivotally mounted on the platform for swinging movement thereon, said saw being mounted on the carriage, a cam drum journaled on the table, drive means extending from the cam drum to the conveyor drive, said cam drum having two cam grooves therein, a cam follower engaging one of the grooves, means connecting said follower and the platform whereby the platform is reciprocated, a second cam follower engaging the second cam groove, and means connecting the second cam follower and the carriage, whereby the carriage is partially rotated.

6. In combination with a conveyor and a drive means for said conveyor, a power driven taper cutting saw, said conveyor moving the work into the saw, said saw comprising a base, a table on the base, a platform reciprocally mounted on the table, a carriage pivotally mounted on the platform for swinging movement thereon, said saw being mounted on the carriage, a cam drum journaled on the table, drive means extending from the cam drum to the conveyor drive, said cam drum having two cam grooves therein, a cam follower engaging one of the grooves, a link connecting said follower and the platform whereby the platform is reciprocated, a second cam follower engaging the second cam groove, and a link connecting the second cam follower and the carriage, whereby the carriage is partially rotated.

WILLIAM A. MacARTHUR.

REFERENCES CITED

The following references are of record in the file of this patent:

UNITED STATES PATENTS

| Number | Name | Date |
|---|---|---|
| Re. 4,109 | Boynton | Aug. 30, 1870 |
| 158,629 | Connor | Jan. 12, 1875 |
| 249,246 | Landon | Nov. 8, 1881 |
| 394,765 | Goehring | Dec. 18, 1888 |
| 394,767 | Goehring | Dec. 18, 1888 |
| 439,894 | Poppert | Nov. 4, 1890 |
| 1,615,088 | Klieber | Jan. 18, 1927 |

FOREIGN PATENTS

| Number | Country | Date |
|---|---|---|
| 304,676 | Germany | May 31, 1918 |